United States Patent [19]

Beard, Jr. et al.

[11] 3,926,847

[45] Dec. 16, 1975

[54] CATALYSTS COMPRISING A METAL HALIDE SALT ON AN INTERSTRATIFIED SYNTHETIC ALUMINOSILICATE CARRIER AND CHLORINATION PROCESSES, ETC.

[75] Inventors: William Q. Beard, Jr.; Patricia H. Moyer; Siegfried E. Penner, all of Wichita, Kans.

[73] Assignee: Vulcan Materials Company, Birmingham, Ala.

[22] Filed: June 4, 1973

[21] Appl. No.: 366,278

[52] U.S. Cl.......... 252/441; 260/654 A; 260/658 R; 260/659 A
[51] Int. Cl.$^2$............................................ B01J 27/10
[58] Field of Search..................................... 252/441

[56] References Cited
UNITED STATES PATENTS

| | | | |
|---|---|---|---|
| 3,252,757 | 5/1966 | Granquist.................. | 252/455 R X |
| 3,252,889 | 5/1966 | Capell et al................ | 252/455 R X |
| 3,267,162 | 8/1966 | Bohl........................... | 252/441 X |
| 3,296,319 | 1/1967 | Bohl et al................... | 252/441 X |
| 3,527,819 | 9/1970 | Berrowitz et al........... | 252/441 X |
| 3,617,488 | 11/1971 | Csicsery..................... | 252/455 Z X |
| 3,655,798 | 4/1972 | Csicsery et al............ | 260/683.2 X |

*Primary Examiner*—Patrick P. Garvin
*Attorney, Agent, or Firm*—Burns, Doane, Swecker & Mathis

[57] ABSTRACT

New catalyst compositions are made comprising a polyvalent metal halide salt on a carrier which is either a synthetic aluminosilicate of mixed layer crystal structure with randomly alternating layers of montmorillonite-like and mica-like structure or a combination thereof with a synthetic crystalline zeolitic component.

These catalysts are useful in the oxychlorination of $C_2$–$C_4$ hydrocarbons or their chlorinated derivatives.

Most specifically, in the oxychlorination of 1,2-dichloroethane the use of these interstratified aluminosilicates as carriers for a copper salt-alkali metal salt catalyst results in a greatly increased mole ratio of perchloroethylene to trichloroethylene in the reaction product.

11 Claims, No Drawings

CATALYSTS COMPRISING A METAL HALIDE SALT ON AN INTERSTRATIFIED SYNTHETIC ALUMINOSILICATE CARRIER AND CHLORINATION PROCESSES, ETC.

BACKGROUND OF THE INVENTION

This invention relates to the oxychlorination of hydrocarbons and chlorinated hydrocarbons, and more particularly to new and improved catalysts therefor. Most particularly, the invention concerns the catalytic oxychlorination of a $C_2$ chlorinated hydrocarbon, such as the conversion of 1,2-dichloroethane (ethylene dichloride) to trichloroethylene and perchloroethylene, whereby a higher ratio of perchloroethylene to trichloroethylene is obtained than is the case with catalysts previously employed for this purpose.

The practice of the invention will be illustrated with respect to the oxychlorination of 1,2-dichloroethane to trichloroethylene and perchloroethylene, using as oxychlorinating agents, hydrogen chloride or chlorine as a source of chlorine, and air or other gas which contains molecular oxygen as a source of oxygen.

The respective reactions may be represented by the equations:

$$CH_2ClCH_2Cl + HCl + O_2 \rightarrow CHCl=CCl_2 + 2 H_2O \quad (1)$$
$$CH_2ClCH_2Cl + 2 HCl + 3/2 O_2 \rightarrow CCl_2=CCl_2 + 3 H_2O \quad (2)$$

It is to be understood, however, that the invention is applicable to the oxychlorination of $C_2$ to $C_4$ hydrocarbons and their chlorinated derivatives in general, and that the foregoing illustration is not to be regarded as limiting.

In the prior art, both fixed bed and fluidized bed catalyst systems have been employed for oxychlorination reactions. Typical of catalysts used in fixed bed systems are those comprising a metal having a variable valence, such as copper supported on a carrier. For example, the catalyst may be cupric chloride deposited on a porous inert carrier such as pumice, activated alumina or diatomaceous earth. A catalyst of this type is described in U.S. Pat. No. 3,184,515. Fixed catalyst beds have the drawback, however, of tending to develop hot spots, with consequent deterioration of the catalyst, and with attendant loss of active material, heat transfer problems and catalyst recovery requirements. Accordingly, a more recent trend has been towards the utilization of fluidized catalyst beds which permit better control of the reaction which is exothermic, corrosive, and even explosive, while at the same time eliminating hot spot formation.

One type of oxychlorination catalyst which has been utilized commercially in fluidized form for this reaction comprises a mixture of cupric chloride and potassium chloride deposited on a carrier of "Florex," a highly calcined fuller's earth, which is essentially a magnesium-aluminum silicate, with minor proportions of iron, calcium, potassium and titanium oxides. The resulting catalyst contains between 6 and 12 percent copper by weight. A catalyst of this kind is described, for example, in U.S. Pat. Nos. 3,267,162 and 3,296,319.

Experience has shown that oxychlorination catalysts of the type described exhibit the undesirable phenomenon of slugging. This abnormality in fluidization is a condition which has been described as one in which bubbles of gas coalesce to a size approaching the order of magnitude of the confining vessel. The particle layers, or slugs of granular solids, between such large gas bubbles, move upward in a piston-like manner, reach a certain height and then disintegrate, with the result that the catalyst rains down as individual particles or smaller aggregates. Slugging is undesirable from a purely mechanical standpoint in that stresses are produced in the reactor arising from shaking of the vessel. Moreover, the size of the reactor is limited owing to the unpredictability of the slugging phenomenon, which sometimes requires that the reactor be placed within a coolant bath consisting of a larger vessel, as described, for example, in British Pat. No. 1,123,477.

Another drawback of such known oxychlorination catalysts of the prior art is that it has not been possible simultaneously to obtain a high yield of perchloroethylene in relation to carbon content of the feed, and good utilization of chlorine, whether furnished as HCl or chlorine or both. These known catalysts bring about the formation of substantial quantities of trichloroethylene, usually such that the mole ratio of perchloroethylene to trichloroethylene, under conditions that would give good chlorine utilization, is less than 3 to 1. Higher perchloroethylene to trichloroethylene mole ratios are obtained only at a chlorine utilization of about 70 percent.

A catalyst that is relatively easy to fluidize without undue slugging and that results in a more favorable ratio of perchloroethylene to trichloroethylene is disclosed in U.S. Pat. No. 3,527,819. It consists essentially of copper chloride, potassium chloride and neodymium chloride deposited on a silica gel carrier. However, while it gives improved performance in the respects just mentioned, it has other drawbacks of its own. Most notably, this known catalyst results in a high burning rate which wastefully converts a relatively high proportion of the organic feed material to oxides of carbon, it results in a relatively low utilization of chlorine, and its cost is high because meodymium is an expensive substance.

Perchloroethylene, which is used primarily for dry cleaning of fabrics and is readily recoverable for reuse, is assuming increasing commercial importance. Trichloroethylene is used primarily for vapor degreasing of automotive and other fabricated metal components. Trichloroethylene usage is expected to decline in view of antipollution regulations such as the Federal Clean Air Act of 1970, categorizing it as a photochemically reactive substance, contributing to air pollution, and hence subject to severe emission restrictions. However, perchloroethylene, a highly chlorinated hydrocarbon containing no hydrogen, is specifically exempted from such restrictions.

In view of these circumstances and trends, there has emerged a need for an improved oxychlorination process and an improved catalyst which would efficiently and economically shift the balance in favor of a greater proportion of highly halogenated hydrocarbons, such as perchloroethylene, in the manufacture of halogenated hydrocarbons.

SUMMARY OF THE INVENTION

In accordance with the present invention, there is provided a major and surprising improvement in the oxychlorination of hydrocarbons and chlorinated hydrocarbons, such as 1,2-dichloroethane, and in catalysts therefor. The catalysts of the invention produce a larger mole ratio of the highly chlorinated reaction products containing no hydrogen to the partially chlorinated reaction products still containing hydrogen than do the catalysts heretofore employed for this purpose. Moreover, they do so under process conditions that would ordinarily be expected to produce relatively large amounts of incompletely chlorinated hydrocarbons such as trichloroethylene. In addition, in the oxychlorination of ethylene dichloride the catalysts according to the invention make it possible to achieve high perchloroethylene yields simultaneously with excellent chlorine utilization, and without the previously unavoidable necessity of accepting a substantial production of trichloroethylene in order to obtain such good chlorine utilization. Thus, in accordance with the invention, perchloroethylene yields of 68 to 80 percent are readily attainable, with chlorine utilization up to 89 percent.

The oxychlorination catalysts of the present invention fall into two categories. Both comprise metal salts deposited on a fluidizable aluminosilicate carrier. The metal salts will advantageously comprise a copper salt, such as cupric chloride and an alkali metal salt such as potassium chloride.

In the first type of catalyst, the aluminosilicate carrier may be categorized broadly as a synthetic layered or interstratified crystalline clay-type aluminosilicate. The hydrated form of this silicate material is described, for instance, in U.S. Pat. No. 3,252,757 and further in U.S. Pat. No. 3,655,798, column 5, lines 6–45 and has the empirical formula:

$$n\mathrm{SiO}_2 : \mathrm{Al}_2\mathrm{O}_3 : m\mathrm{AB}_x : x\mathrm{H}_2\mathrm{O} \quad (3)$$

wherein the layer lattices comprise the silica, the alumina, and constituent B, which is a negative ion internal to the lattice, such as $F^-$ or $OH^-$, or $O^{--}$. A is one equivalent of an exchangeable cation having a valence not greater than 2, such as $H^+$, $NH_4^+$, $Na^+$, $K^+$, $Li^+$, $\frac{1}{2}Ca^{++}$, $\frac{1}{2}Mg^{++}$, $\frac{1}{2}Sr^{++}$, and $\frac{1}{2}Ba^{++}$, and is external to the lattice; $n$ is from 2.4 to 3.0, $m$ is from 0.2 to 0.6, and $x$ is from 2.0 to 3.5 at 50 percent relative humidity. A dehydrated form of the same aluminosilicate material is disclosed in U.S. Pat. No. 3,252,889.

These aluminosilicates comprise interstratified structures of randomly alternating illite, i.e., mica-like, and smectite, i.e., montmorillonite-like, layers. The approximate percentage of mica-like layers usually is 60 to 70 percent. These materials have been previously utilized as insecticide carriers, drilling mud additives, and hydrocarbon cracking catalysts, but not, so far as known, as oxychlorination catalysts carriers.

In the second type of catalyst made in accordance with the invention, the foregoing synthetic crystalline aluminosilicate carrier component is further associated with a zeolitic component, such as a crystalline molecular sieve component, and the metal salts are deposited thereon. These two-component carrier materials comprising (a) an interstratified synthetic crystalline montmorillonite-mica aluminosilicate component and (b) a crystalline molecular sieve component, are described, for example, in U.S. Pat. Nos. 3,617,488 and 3,663,424, in which they are disclosed as useful in hydrotreating catalysts. Their usefulness as the carrier component in oxychlorination catalysts is believed to be novel.

DETAILED DESCRIPTION OF THE INVENTION

The present invention is applicable to the oxychlorination of $C_2$–$C_4$ hydrocarbons and their incompletely chlorinated derivatives. The latter may comprise chlorine addition and substitution products of aliphatics having two to four carbon atoms per molecule. Stated differently, compounds suitable for feeding as starting materials to the system are chlorinatable aliphatic compounds having the formula $C_nH_mCl_r$, where $n$ is an integer from 2 to 4, $m$ is an integer from 1 to not more than $2n + 2$, the sum of $m + r$ is either $2n + 2$, $2n$ or $2n - 2$, and $r$ is correspondingly an integer from 0 to not more than $2n$. More particularly, when $m + r$ is $2n + 2$, $r$ is correspondingly an integer from 0 to $2n$; when $m + r$ is $2n$, $r$ is an integer from 0 to $2n - 1$; and when $m + r$ is $2n - 2$, $r$ is an integer from 0 to $2n - 3$. Most commonly, the feed comprises compounds in which the sum of $m + r$ is $2n + 2$.

Examples of suitable hydrocarbon starting materials include saturated aliphatic hydrocarbons, such as ethane, propane, and butanes, and unsaturated aliphatic hydrocarbons such as ethylene, propylene and butylenes. Corresponding chlorinated derivatives of these hydrocarbons containing two chlorine atoms per molecule include ethylene dichloride (1,2-dichloroethane), dichlorobutane, dichlorobutene, and the like, and represent the preferred starting materials. However, incompletely chlorinated hydrocarbons containing either less than two chlorine atoms per molecule, e.g., ethyl chloride, or more than two chlorine atoms per molecule, e.g., 1,1,2-trichloroethane and 1,2,3-trichlorobutadiene-1,3, may also be useful. The type and variety of products which are obtained will depend upon the starting material and the reaction conditions, in accordance with considerations well known in this art. For example, the number of different products obtained will increase as the number of carbon atoms in the starting material is increased and will decrease as the number of chlorine atoms already on the molecule is increased.

As indicated previously, the practice of the invention is conveniently illustrated with respect to the oxychlorination of 1,2-dichloroethane. In this reaction, there are formed, besides trichloroethylene and perchloroethylene, some lower boiling compounds and some higher boiling compounds, as well as carbon monoxide and dioxide. Lower boiling compounds usually include vinyl chloride, ethyl chloride, vinylidene chloride, trans- and cis-dichloroethylene, and carbon tetrachloride. Higher boiling compounds usually include unsymmetrical-tetrachloroethane, symmetrical-tetrachloroethane, pentachloroethane, and hexachloroethane. Traces of hexachlorobutadiene and hexachlorobenzene may also be present. The factors governing the mole ratio of perchloroethylene to trichloroethylene also govern the nature and extent of by-product formation. However, the total by-products formed, in relation to the total yield of per- and trichloroethylene, ordinarily should not exceed about 8 percent, and desirably is significantly less.

The active ingredient of the catalyst-carrier combination, whichever form of the latter is chosen, is a metal salt, usually a halide, typically a chloride or an oxychloride. The metal is a polyvalent metal having a valence of 2 or more, such as, for example, copper or iron, with copper being preferred. Advantageously, the foregoing metal chloride may be combined with an alkali metal chloride, such as potassium, sodium, or lithium chloride. A preferred catalytic agent is one comprising cuprous chloride or cupric chloride or oxychloride and potassium chloride. In an oxidizing environment cuprous chloride is readily converted to cupric chloride, while cupric chloride or oxychloride is readily converted to cuprous chloride in a reducing environment.

It has been found, surprisingly and unexpectedly, that when the metal salt catalytic agent is applied to a carrier such as a fluidizable interstratified crystalline clay-type aluminosilicate or to a carrier comprising a combination thereof with a crystalline molecular sieve or zeolite component, the result is to bring about a significant increase in the mole ratio of HCl and/or $Cl_2$ to the $C_2 - C_4$ hydrocarbon and/or chlorinated derivatives that may be employed in the process without decreasing the percent Cl utilization obtained. In comparison with known catalysts which are considered illustrative of the prior art, this brings about an important increase in the proportion of highly chlorinated reaction products containing no hydrogen, e.g., as much as a fivefold increase in the mole ratio of perchloroethylene to trichloroethylene in the reaction product obtained in the oxychlorination of ethylene dichloride, raising this ratio to at least about 5:1.

Whichever carrier is employed, the cupric chloride-alkali metal chloride aqueous solution is applied thereto by impregnation of the relatively porous carrier structure, in accordance with conventional procedures. The amount of metal salts used is such that the catalyst product contains between about 2 and about 15 percent combined copper, and between about 1 and about 15 percent combined alkali metal calculated as the uncombined metal, the percent by weight being based on the total weight of the uncombined metals and said carrier. The solution may be applied to the carrier by spraying, immersion or the like.

Where the carrier includes a zeolitic component, the latter may constitute from about 1 to about 70 percent by weight of the total carrier in the catalyst composition. The zeolitic component may be of any of the well known types now extensively used as cracking catalysts, such as faujasite, especially types X and Y, or mordenite, and is preferably employed in its hydrogen or ammonium form.

Both these carrier components are associated in particle form, usually as microspheres of fluidizable size having an average particle diameter of between about 40 and 80 microns, preferably between 50 and 60 microns. The respective component particles may be intimately admixed prior to impregnation, or they may be held together by means of a suitable binder such as an amorphous silica gel matrix in which the respective particles are dispersed, substantially as described, for instance, in U.S. Pat. No. 3,655,798, column 9, line 46 to column 10, line 4.

For utilization as fluidized bed catalysts, the catalysts of the invention are charged to the reactor in a state of subdivision in which the particle diameters range predominantly between about 20 and about 100 microns, with usually not more than about 10 percent by weight of the material being below or above this range.

The oxychlorination operation using this form of catalyst is performed employing conventional fluidized bed techniques. Thus, the hydrocarbon or chlorinated hydrocarbon starting material is supplied to the lower portion of a fluidized bed type reactor in the gaseous phase, together with the source of chlorine (either HCl gas, or chlorine gas, or a mixture of both), and the source of oxygen (oxygen itself or an oxygen containing gas). The ratios of the foregoing reactants in the feed should provide approximately 1.7 to 2.0 grams atoms of total chlorine per gram atom of carbon, including both chlorine already combined with carbon and chlorine present as HCl and/or chlorine, and additionally should provide approximately 0.4 to 0.7 gram atoms of oxygen per gram atom of total hydrogen whether such hydrogen is bound to carbon or to chlorine.

The linear velocity of the reactant vapors passing upwardly through the bed of fluidized catalyst in the reactor will depend upon the reactor diameter, but may be of the order of about 0.4 to 3 feet per second, i.e., about 10 to 90 cm per second.

The reactor pressure ordinarily is atmospheric or somewhat superatmospheric, e.g., between about 1 and 5 atmospheres (0 to about 65 psig), although subatmospheric as well as high pressures in excess of 5 atmospheres are operative. Fluidized bed temperatures, the reaction being exothermic, will tend to rise, but are desirably maintained between about 315° and about 485°C., preferably between about 375° and about 450°C.

The microspheroidal shape of the catalyst particles of the present invention, together with small size and favorable density, results in a catalyst that fluidizes well and does not undergo slugging at practical ratios of height to diameter of the reactor. This makes it possible to conduct an oxychlorination reaction to highly chlorinated products such as perchloroethylene in reactors of much larger diameter than those feasible with oxychlorination catalysts heretofore known for such purpose.

DESCRIPTION OF THE PREFERRED EMBODIMENTS

The following examples and accompanying Table serve to illustrate the practice of the invention, including the preparation and utilization of the catalysts, but are not to be considered as limiting the invention thereto.

EXAMPLE 1

Part A — Preparation of $CuCl_2$-KCl Layered Aluminosilicate Catalyst

A catalyst composition was prepared using a carrier a layered crystalline aluminosilicate material of the smectiteillite class in microspherical form which had been calcined at 1,200°F. for three hours.

This carrier "BARASYM SMM-100" Brand product of N.L. Industries, Inc., had the following properties:

| | Typical Analysis |
|---|---|
| Appearance: White, free-flowing powder | 48–49% $SiO_2$ |
| Particle Size: 20–80 microns (microspheres) | 32–37% $Al_2O_3$ |
| Density. Apparent: 0.6–0.7 g/ml | 2.2–2.6% $NH_3$ |
| True: 2.5 g/ml | 0.4–1.6% F |
| Cation Exchange Capacity: 124 me/100g | 7.5–12% $H_2O$ |
| pH of 10% Dispersion: 5.9 | Traces: Ni, Fe, Na, Ca, Mg, Ti, K and Zr |
| Surface Area: 180 m²/g (or less depending on calcination temperature) | |
| Pore Volume: 0.45 cc/g | |

2,390 grams of this powdered carrier was spread out on a large sheet of polyethylene. An aqueous solution of 697 grams of cupric chloride dihydrate and 367 grams of potassium chloride in a total volume of 2,151 milliliters was sprinkled over it as evenly as possible in portions followed by thorough manual mixing each time. All the solution was taken up by the solid. The mixture was dried under heat lamps with frequent stirring and mixing to break up lumps, and finally dried in an oven at 220°C. This catalyst composition contained 9.12 weight percent combined copper, as shown by analysis, and a calculated 6.64 weight percent of combined potassium calculated as the uncombined metal, the percent by weight being based on the total weight of the uncombined metals and the carrier.

Part B — Preparation of CuCl$_2$-NaCl Layered Alumino-silicate-Zeolitic Component Catalyst A 1,975-gram quantity of the catalyst carrier, a finely divided layered crystalline aluminosilicate combined with a component of zeolitic structure (the mixture being available as "BARASYM FCC-1030" Brand product of N.L. Industries, Inc.) was spread out on a large sheet of polyethylene. An aqueous solution containing 621 grams of cupric chloride dihydrate and 327 grams of sodium chloride in a total volume of 2,370 milliliters was sprinkled over this as evenly as possible in portions followed by thorough manual mixing each time. All the solution was absorbed into the solid. The mixture was dried under heat lamps with frequent stirring and mixing to break up lumps, and finally dried in an oven at 220°C. This catalyst composition contained 10.26 weight percent combined copper, as shown by analysis, and a calculated 5.67 weight percent combined sodium, calculated as the uncombined metal, the percent by weight being based on the total weight of the uncombined metals and the carrier.

Part C — Calcined Fuller's Earth Carrier

A catalyst representative of those of the prior art was prepared as follows. Three pounds of 30–60 mesh "Florex" clay was charged to an externally heated 4-inch diameter glass pipe. The particles were fluidized by hot air and a solution of 395 grams of copper chloride dihydrate and 207 grams of potassium chloride in 900 grams of distilled water was added while maintaining the temperature of the bed at about b 130°C. The bed was heated for an additional period after the addition was complete to drive off the remaining water. Two batches were prepared and combined. The final mixture contained 93.5 weight percent particles of particle size between 30–60 mesh, and 10.1 percent between 50–60 mesh.

EXAMPLE 2

Oxychlorination of 1,2-Dichloroethane

A series of test runs was made performing the oxychlorination of 1,2-dichloroethane using the catalysts prepared according to Example 1, Parts A to C. The conditions and results of runs using the catalyst compositions of the invention are set forth in the first seven columns of Table 1 below. The catalyst composition used in each case is identified with the foregoing "Part" numbers. A comparison test run made with the prior art catalyst prepared according to Example 1, Part C, is summarized in the eighth column of the table. In addition experiments were made using catalyst compositions containing neodumium and lanthanum, duplicating those described in Examples A and 1, respectively, of U.S. Pat. No. 3,527,819. Furthermore, the results from similar runs which were reported in U.S. Pat. No. 3,267,162 (Table II) are also reproduced in columns 9 and 10 of Table 1 for comparison.

In performing the test runs, a fluidized bed reactor having a reaction zone 2 inches in diameter and 13 feet in height and an expansion zone 6 inches in diameter and 2 feet in height was employed. The reactor was provided with a movable thermocouple within a central thermowell which extended from the top to within 3 inches of the bottom of the bed. Vaporized 1,2-dichloroethane was mixed at a tee with air and HCl or Cl$_2$. The feeds were then led through a ¼-inch tube 6 inches in length to a coneshaped inlet which was flanged onto the reaction zone of the fluid bed. A screen supported on the bottom flange served as the gas distributor. The reaction zone was provided with an electrically heated jacket containing "Dowtherm A," a mixture of diphenyl ether and biphenyl, the temperature of which was adjusted in order to regulate the temperature within the fluid bed.

For a typical run, the reactor was charged with sufficient catalyst to provide a fluidized bed height of approximately 6 feet (approximately 180 cm). The bed was fluidized with nitrogen at atmospheric pressure and preheated to a temperature of 25° to 40°C. below the desired operating temperature. Feeds were then substituted for the nitrogen flow and the pressure adjusted to the desired value by means of a back pressure regulator. A superficial linear gas velocity of 0.6 feet per second (18.3 cm/sec) was employed in the reactor. Typical results obtained with the catalysts of this invention in this apparatus are shown in Table 1, first six columns. A catalyst typical of those used commercially in the prior art was used in the run reported in column 8. It is evident that use of the catalysts of this invention resulted in a combination of higher HCl utilization with a higher ratio of perchloroethylene to trichloroethylene than was obtained using the catalysts used in the prior art.

TABLE 1

| Test Run No. | OXYCHLORINATION OF 1,2-DICHLOROETHANE | | | | |
|---|---|---|---|---|---|
| | (1) | (2) | (3) | (4) | (5) |
| Catalyst according to | | | | | |
| Example 1, Part | A | A | A | A | B |
| Procedure as in Example: | 2 | 2 | 2 | 2 | 2 |
| Feed Ratios, in moles | | | | | |
| HCl/1,2-dichloroethane | 1.82 | 1.65 | — | 1.38 | 2.05 |
| Cl$_2$/1,2-dichloroethane | — | — | 0.835 | — | — |
| Air/1,2-dichloroethane | 8.67 | 7.95 | 5.96 | 7.38 | 10.38 |
| O$_2$/1,2-dichloroethane | — | — | — | — | — |
| Catalyst weight, grams | 2,387 | 2,387 | 2,387 | 2,328 | 1,859 |
| Reactor pressure, psig | 60 | 60 | 60 | 62 | 59 |
| Bed temperature, °C | 411 | 424 | 425 | 413 | 417 |
| Recovery as mole percent of total organics fed | | | | | |

TABLE 1-continued

OXYCHLORINATION OF 1,2-DICHLOROETHANE

| Test Run No. | (1) | (2) | (3) | (4) | (5) |
|---|---|---|---|---|---|
| $C_2Cl_4$ | 76.7 | 68.0 | 68.3 | 53.5 | 79.8 |
| $C_2HCl_3$ | 3.5 | 12.7 | 12.3 | 25.6 | 0.9 |
| $C_2Cl_4/C_2HCl_3$, mole ratio in product | 21.9 | 5.4 | 5.5 | 2.1 | 86.8 |
| HCl or $Cl_2$ conversion, percent | 85.7 | 86.4 | 86.8 | 85.7 | 83.5 |

| Test Run No. | (6) | (7) | (8)* | (9)* | (10)* |
|---|---|---|---|---|---|
| Catalyst according to Example 1, Part | B | B | C | \multicolumn{2}{c}{Taken from U.S. Patent 3,267,162, Table II.} |
| Process as in Example: | 2 | 3 | 2 | | |
| Feed Ratios, in moles | | | | | |
| HCl/1,2-dichloroethane | 1.66 | 1.65 | 1.39 | — | — |
| $Cl_2$/1,2-dichloroethane | — | — | — | — | — |
| Air/1,2-dichloroethane | 8.11 | — | 6.70 | — | — |
| $O_2$/1,2-dichloroethane | — | 1.74 | — | — | — |
| Catalyst weight, grams | 1,859 | 425 | 2,268 | \multicolumn{2}{c}{Bed was 5 feet deep} |
| Reactor pressure, psig | 62 | 0.3 | 61 | 5 | 15 |
| Bed temperature, °C | 415 | 420 | 406 | 415 | 424 |
| Recovery as mole percent of total organics fed | | | | | |
| $C_2Cl_4$ | 69.5 | 69.8 | 38.2 | 59.4 | 54.6 |
| $C_2HCl_3$ | 11.0 | 12.5 | 38.7 | 13.7 | 20.2 |
| $C_2Cl_4/C_2HCl_3$, mole ratio in product | 6.3 | 5.6 | 0.99 | 4.3 | 2.7 |
| HCl or $Cl_2$ conversion, percent | 88.5 | 87.5 | 64.1 | 71.5 | 82.0 |

*Prior art.

The mole ratio of perchloroethylene to trichloroethylene, which was only 0.99 using the prior art catalyst (column 8), was increased to more than 5 in all but one of the runs shown using the catalysts of the invention. In the run shown in column 4, in which a perchloroethylene to trichloroethylene ratio of 2.1 was obtained because of the lower HCl to EDC ratio employed, the HCl conversion was very much higher and the perchloroethylene to trichloroethylene ratio itself was still more than twice that obtained with the catalyst of the prior art (column 8). A $Cl_2Cl_4/C_2HCl_3$ ratio of almost 90 was achieved in run 5 by using an exceptionally high HCl/EDC ratio, while still maintaining a chlorine utilization substantially better than that obtained in the prior art procedures under conditions giving a $C_2Cl_4/C_2HCl_3$ ratio of 4 or better. For instance, it may be pointed out specifically that while a chlorine utilization of 86.5 percent is reported in Example 2 of U.S. Pat. No. 3,267,162, the reported $C_2Cl_4/C_2HCl_3$ ratio in that case was not much above 2. The expensive neodymium or lanthanum catalysts which were proposed in U.S. Pat. No. 3,527,819, when tested, gave perchloroethylene/trichloroethylene product ratios that were more than 5 and in this respect therefore more nearly like those obtained with the present invention. However, at the same time these prior art catalysts resulted in significantly poorer chlorine conversions and very much higher conversions of valuable organic feed to unwanted oxides of carbon, than in the practice of the invention.

EXAMPLE 3

The test run in the seventh column of Table 1 was made using 425 grams of the catalyst prepared according to Example 1, Part B. The reactor used was a glass unit the reaction zone of which was 1.3 inches in diameter and 4 feet in height with an expansion zone 5 inches in both diameter and height. The reactor was electrically heated and controlled to provide isothermal operation. A glass frit served as the gas distributor. Vaporized 1,2-dichloroethane, HCl and oxygen gas were mixed at a tee a few inches ahead of the frit and passed into the reactor and upwardly through the catalyst at a superficial linear velocity of 0.4 feet per second (12.2 cm/sec).

The reactor was charged with enough catalyst so that upon fluidization the top of the bed barely reached the beginning of the expansion zone. The reactor was fluidized with nitrogen and preheated to approximately the desired temperature of operation. The feeds were then substituted for the nitrogen and the temperature raised to the desired operating temperature. The results obtained using this reactor are set forth in column 7 of Table 1. Here also a high mole ratio of perchloroethylene to trichloroethylene of 5.6:1 as well as high chlorine utilization were obtained.

The foregoing disclosure and detailed examples serve to describe the invention, its nature and its advantages, and the manner and process of making and using it, and set forth the best modes presently contemplated for carrying it out. However, it should be understood that many variations may be made therein without departing from the scope or spirit of the invention as defined and claimed hereinbelow.

What is claimed is:

1. A catalyst composition useful for oxychlorination, the catalyst composition consisting essentially of a variable valence metal halide catalyst component deposited on a synthetic aluminosilicate carrier component, the variable valence metal halide consisting of a copper halide, the synthetic aluminosilicate having a mixed layer crystal structure with randomly alternating layers of montmorillonite-like and mica-like structure, the copper halide being present in the catalyst composition in an amount between about 2% and about 15% calculated as uncombined copper.

2. The catalyst composition of claim 1 in which said carrier component consists essentially of said interstratified aluminosilicate associated with from about 1 to about 70 percent by weight of the total carrier of a crystalline molecular sieve.

3. The catalyst composition of claim 1 in which said metal halide is cupric chloride.

4. The catalyst composition of claim 3 in which the aluminosilicate of layered montmorillonite-mica type is in finely divided fluidizable form.

5. The catalyst composition of claim 1 wherein an alkali metal chloride is present in the catalyst composition in an amount between about 1% and about 15% calculated as uncombined alkali metal.

6. The catalyst composition of claim 5 in which said carrier component consists essentially of said interstratified aluminosilicate associated with from about 1 to about 70 percent by weight of the total carrier of a crystalline molecular sieve.

7. The catalyst composition of claim 5 in which said variable valence metal halide is cupric chloride and said alkali metal chloride is potassium chloride.

8. The catalyst composition of claim 5 in which said variable valence metal halide is cupric chloride and said alkali metal chloride is sodium chloride.

9. The catalyst composition of claim 4 wherein an alkali metal halide is present in the catalyst composition in an amount between about 1 and 15 percent by weight, the percent by weight being based on the total weight of the copper and alkali metals and the said carrier.

10. An oxychlorination catalyst composition, the catalyst composition consisting essentially of a copper chloride and sodium or potassium chloride deposited on a synthetic aluminosilicate carrier component, the synthetic aluminosilicate being in finely divided fluidizable particles of microspheroidal shape in which the particle diameters range predominantly between about 20 and about 100 microns, the synthetic aluminosilicate consisting essentially of a mixed layer crystal structure with randomly alternating layers of montmorillonite-like and mica-like structure, the copper halide being present in the catalyst composition in an amount between about 2 and about 15 percent calculated as uncombined copper and the sodium or potassium chloride being present in the catalyst composition in an amount between about 1 and about 15 percent calculated as uncombined sodium or potassium.

11. The catalyst composition of claim 10 in which said carrier component consists essentially of said interstratified aluminosilicate associated with from about 1 to about 70 percent by weight of the total carrier of a crystalline molecular sieve.

* * * * *